L. C. DIBERT.
BEAN CLEANING APPARATUS.
APPLICATION FILED MAR. 24, 1919.
1,356,049.
Patented Oct. 19, 1920.
2 SHEETS—SHEET 1.
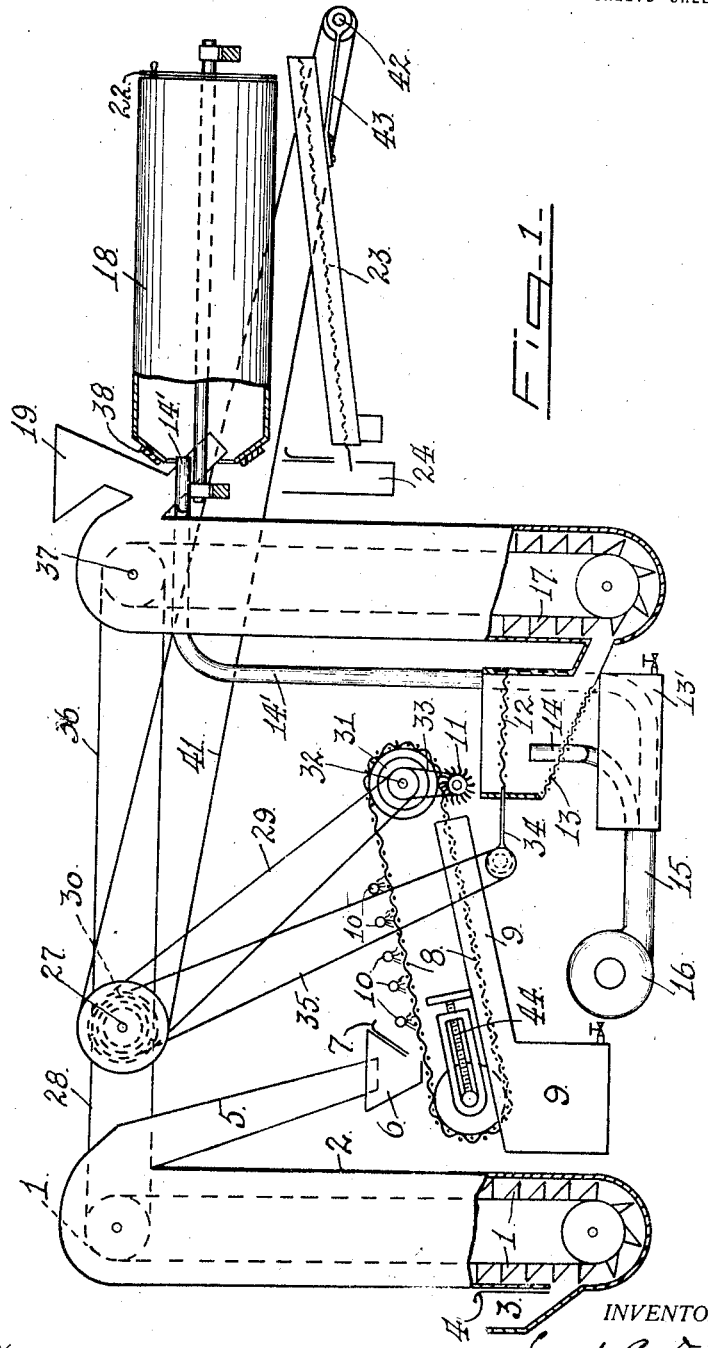
WITNESS
INVENTOR
Loyd C. Dibert
BY
Booth & Booth
ATTORNEYS

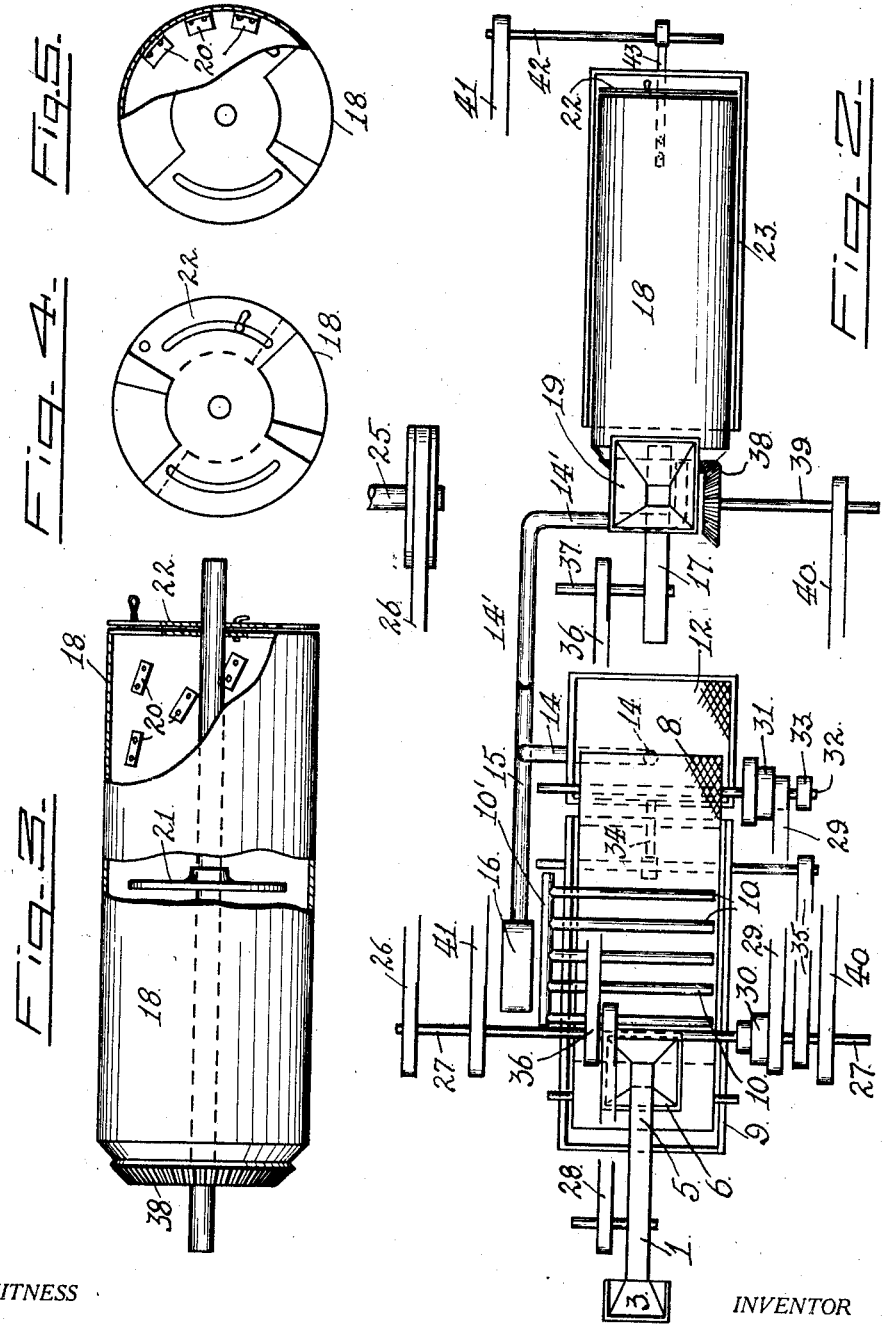

UNITED STATES PATENT OFFICE.

LOYD C. DIBERT, OF SAN FRANCISCO, CALIFORNIA.

BEAN-CLEANING APPARATUS.

1,356,049.  Specification of Letters Patent.  Patented Oct. 19, 1920.

Application filed March 24, 1919. Serial No. 284,642.

*To all whom it may concern:*

Be it known that I, LOYD C. DIBERT, a citizen of the United States, residing at the city and county of San Francisco and State of California, have invented certain new and useful Improvements in Bean-Cleaning Apparatus, of which the following is a specification.

My invention relates in general to the art of preparing beans for the market, and, in particular, to an apparatus adapted for the treatment of beans to make them merchantable, the essential object being to clean them.

By cleaning is meant, not merely the removal from the bean surface of any foreign matter, though this is also included, but, chiefly, the separation from the beans of foreign independent particles with which they are associated as they come in from the field. A small percentage of these particles are rocks and woody substances which are easy to remove by many known methods, but by far the largest percentage of foreign particles are of an earthy nature, being, especially in the California product, of adobe soil. These particles of adobe, by friction, soon assume substantially the size and somewhat the shape of the beans, so that they do not readily yield to principles of separation dependent upon these characteristics; and, in practice, it is found quite difficult to effect a separation But as the adobe particles are readily softened by and are capable of mechanical solution or suspension in water it follows that by using water the double object of washing off the bean surfaces and of separating out the independent earthy particles is attained.

The use of water must, however, be a guarded one, as to time, for if the application of water be maintained for too long a period, the beans will suffer injury. This period must, therefore, be one which is long enough to dissolve out the adobe but is too short to injure the beans.

Moreover, having wet the beans in the adobe separating step, it is essential that, as promptly as possible, they shall be dried again, and if in this part of the treatment, the polishing be included, a distinct advance results.

In view of the foregoing, I may now state that the object of my invention is to provide an apparatus for the treatment of beans, by which the washing of the beans and the removal of the foreign independent earthy particles by the wash water are initially effected, without injury to the beans, and by which the beans are then promptly dried and polished.

To this end my invention consists in the novel apparatus which I shall now fully describe by reference to the accompanying drawings, in which—

Figure 1 is a side view, partly in section, and more or less diagrammatic or conventional, of my apparatus.

Fig. 2 is a plan view of the same.

Fig. 3 is a broken elevation, enlarged, of the drying and polishing cylinder.

Fig. 4 is an end view of said cylinder, showing the regulating gate.

Fig. 5 is an end view of the cylinder broken, and with the end gate omitted.

It is to be understood that a suitable frame, herein omitted, to avoid confusion, supports the functional parts of the apparatus.

At one end of the device is an elevator 1, with a casing 2, having a supply hopper 3 with a regulating slide 4. The spout 5 of the elevator delivers to a feed hopper 6 with a slide 7, and said hopper delivers to a traveling screen carrier, here indicated as a wire belt 8, below which is a tank 9.

Above the carrier 8 are spray pipes 10, connected with a header 10', Fig. 2, which leads from suitable source of water supply, not shown. These pipes may be arranged longitudinally or, as here shown, transversely, and they are adapted to discharge sprays, preferably fan shaped, upon the screen carrier 8.

Under the delivery end of the carrier is a rotating brush 11, Fig. 1, to clean the carrier surface, and below said delivery end is a shaking screen 12, below which is a screen floor 13, with an underlying tank 13'. Through this floor is let a branch pipe 14 from an air pipe 15 fitted with a fan 16. Through these pipes air is blown up under the screen 12, and this air may be cold or hot, preferably the latter, the heat being supplied by a burner, not shown, to which the pipe 15 is exposed, and the degree of heat may be properly regulated.

The delivery end of the screen floor 13 leads to an elevator 17, which is in communication with the head end of a rotatable cylinder 18. Into the head end of this cylinder enters a branch pipe 14' from the air pipe 15.

Also into the cylinder head enters the discharge of a hopper 19 which delivers an absorbent and polishing material, in practice, saw dust.

Within the cylinder are agitating flanges 20, Figs. 3 and 5, and about its middle is a baffle 21 against which the air blast is directed to modify its velocity, Fig. 3. The tail end of the cylinder 18 is fitted with a rotatable regulating gate 22, like a damper, as shown in Fig. 4. This gate delivers upon the head end of a shaking screen 23, which delivers into a suction column or aspirator sufficiently indicated at 24, in Fig. 1.

The driving mechanism is as follows:— 25, in Fig. 2, is a counter-shaft, by which the power is led in. From this shaft, through a belt 26 a cross shaft 27 is driven. A belt 28 from the last named shaft drives the elevator 1. The screen carrier 8 is driven at regulatable speeds, by means of a belt 29 from a cone or step pulley 30 on the cross shaft 27 to a cone or step pulley 31 on the driving shaft 32 of the carrier, as seen in Fig. 2. The brush 11 is driven by a belt 33, Fig. 1, from the shaft 32. The screen 12 is shaken by an eccentric rod 34, operated by a belt 35, Fig. 1, from the cross shaft 27. The second elevator 17 is driven by a belt 36 from the cross shaft 27 to the shaft 37 of said elevator.

The fan 16 may be driven by a suitable connection, not shown, from the cross shaft 27.

The cylinder 18 is rotated by bevel gears 38, driven by a shaft 39 and a belt 40 from the cross shaft 27. The final screen 23 is driven by belt 41 from the cross shaft 27, leading to a shaft 42 which operates an eccentric rod 43 connected with said screen.

44 in Fig. 1, indicates a take up to adjust the tension of the screen carrier 8.

The operation of my apparatus is as follows:—The beans mixed with adobe particles are fed to the supply hopper 3, from which they are taken by the elevator 1 and delivered to the feed hopper 6. From this hopper they are delivered upon the traveling screen carrier 8. While on this carrier the material is subjected to sprays of water from the pipes 10. This water not only washes the dirt from surface of the beans, but it also softens and dissolves the independent earthy particles, and all the dirt so carried in suspension by the water passes through the open carrier into the underlying tank 9.

The beans now clean and separated from the earthy particles, pass around the delivery end of the carrier 8, which is kept clean by the brush 11, and fall upon the screen 12. While on this screen, and as they fall through it, the wet beans are met by the current of air from the branch pipe 14 and are partially dried. The water passes through the screen floor 13, but the beans are delivered from said floor to the elevator 17 and by said elevator, they are delivered to the rotating cylinder 18. Into this cylinder is also delivered the saw dust from the hopper 19.

In the cylinder the beans are subjected to the complete drying effect of the air from the branch pipe 14', and to the polishing and drying action of the saw dust, and they are agitated and advanced through the cylinder to its tail end, where their delivery is regulated by the gate 22.

From this gate, the beans and saw dust are delivered upon the shaking screen 23, through which the saw dust sifts and from which the now dried and polished beans are delivered to the suction column 24 which removes any other dross from them.

The object of driving the carrier 8 at regulatable speeds is to provide the proper time period during which any batch of beans being run has to be subjected to the water treatment. Some batches may contain a greater percentage of earthy particles, or said particles may be drier and therefore harder than usual. In such cases the carrier is run at slower speed to give time for the softening and dissolution of said particles, but in any case this time period must not be prolonged to the injury of the beans. By regulating the speed of the carrier a nice proportional adjustment may be obtained.

I claim:—

1. A bean-cleaning apparatus comprising a screen-carrier to which the beans are fed and by which they are advanced; means for directing sprays of water upon said beans while on the carrier, to separate and screen out the water-soluble particles; means for subjecting the beans after leaving the carrier to the drying action of air; and means for polishing the beans as they are being dried.

2. A bean-cleaning apparatus comprising a screen-carrier to which the beans are fed and by which they are advanced; means for varying the time period during which the beans are on the carrier; means for directing sprays of water upon said beans while on the carrier, to separate and screen out the water-soluble particles; means for subjecting the beans after leaving the carrier to the drying action of air; and means for polishing the beans as they are being dried.

3. A bean-cleaning apparatus comprising a screen-carrier to which the beans are fed and by which they are advanced; means for directing sprays of water upon said beans while on the carrier, to separate and screen out the water soluble particles; a screen-floor to which the beans are delivered by the carrier and by which the surplus water is drained away; a rotatable agitating cylinder to which the beans are carried from the perforated floor; and means for delivering to said cylinder a current of drying air.

4. A bean-cleaning apparatus comprising a screen-carrier to which the beans are fed and by which they are advanced; means for directing sprays of water upon said beans while on the carrier, to separate and screen out the water soluble particles; a screen-floor to which the beans are delivered by the carrier and by which the surplus water is drained away; a rotatable agitating cylinder to which the beans are carried from the perforated floor; means for delivering to said cylinder a current of drying air; and means for delivering to said cylinder an absorbent and polishing medium.

5. A bean-cleaning apparatus comprising a screen-carrier to which the beans are fed and by which they are advanced; means for directing sprays of water upon said beans while on the carrier, to separate and screen out the water soluble particles; a screen-floor to which the beans are delivered by the carrier and by which the surplus water is drained away; a rotatable agitating cylinder to which the beans are carried from the perforated floor; means for delivering to said cylinder a current of drying air; means for delivering to said cylinder an absorbent and polishing medium; and a shaking screen to which the cylinder delivers and by which the absorbent and polishing medium is sifted out.

6. A bean-cleaning apparatus comprising a screen-carrier to which the beans are fed and by which they are advanced; means for varying the time period during which the beans are on the carrier; means for directing sprays of water upon said beans while on the carrier, to separate and screen out the water soluble particles; a screen-floor to which the beans are delivered by the carrier and by which the surplus water is drained away; a rotatable agitating cylinder to which the beans are carried from the perforated floor; means for delivering to said cylinder a current of drying air; means for delivering to said cylinder an absorbent and polishing medium; and a shaking screen to which the cylinder delivers and by which the absorbent and polishing medium is sifted out.

7. A bean-cleaning apparatus comprising an elevator to feed the beans; a traveling screen carrier to which the elevator delivers; means for varying the speed of travel of said carrier; means for directing sprays of water upon the beans while on the carrier, to separate and screen out the water soluble particles; a shaking screen to which beans are delivered by the carrier; a screen floor under said shaking screen to drain the surplus water; a pipe to direct a current of air upon the beans while passing through the shaking screen; an elevator receiving the beans from the screen floor; a rotatable agitating cylinder to which the beans are delivered by the elevator; a pipe for delivering a current of air into said cylinder; a hopper for delivering an absorbent and polishing medium to the cylinder; and a shaking screen to which the cylinder delivers the beans and by which the absorbent and polishing medium is sifted out.

In testimony whereof I have signed my name to this specification in the presence of two subscribing witnesses.

LOYD C. DIBERT.

Witnesses:
Wm. F. Booth,
D. B. Richards.